(12) United States Patent
Sehrawat

(10) Patent No.: US 11,645,409 B2
(45) Date of Patent: May 9, 2023

(54) SEARCH AND ACCESS PATTERN HIDING VERIFIABLE SEARCHABLE ENCRYPTION FOR DISTRIBUTED SETTINGS WITH MALICIOUS SERVERS

(71) Applicant: Seagate Technology LLC, Fremont, CA (US)

(72) Inventor: Vipin Singh Sehrawat, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 208 days.

(21) Appl. No.: 17/127,038

(22) Filed: Dec. 18, 2020

(65) Prior Publication Data

US 2022/0198048 A1      Jun. 23, 2022

(51) Int. Cl.
*G06F 21/62* (2013.01)
*G06F 21/60* (2013.01)
*H04L 9/08* (2006.01)
*G06F 21/31* (2013.01)

(52) U.S. Cl.
CPC .......... *G06F 21/6227* (2013.01); *G06F 21/31* (2013.01); *G06F 21/602* (2013.01); *H04L 9/085* (2013.01); *H04L 9/0825* (2013.01)

(58) Field of Classification Search
CPC .... G06F 21/6227; G06F 21/31; G06F 21/602; H04L 9/0825; H04L 9/085
See application file for complete search history.

(56) References Cited

U.S. PATENT DOCUMENTS

| | | | | |
|---|---|---|---|---|
| 9,977,918 B2 * | 5/2018 | Fan | ...................... | H04L 9/0618 |
| 10,476,662 B2 * | 11/2019 | Yuan | ...................... | H04L 9/0894 |
| 2007/0283086 A1 * | 12/2007 | Bates | ...................... | G06F 3/0613 |
| | | | | 711/113 |
| 2014/0101438 A1 * | 4/2014 | Elovici | ...................... | H04L 9/14 |
| | | | | 713/165 |
| 2018/0294952 A1 * | 10/2018 | Yuan | ...................... | H04L 9/3213 |
| 2018/0349617 A1 * | 12/2018 | Wang | ...................... | H04L 9/3239 |
| 2019/0087432 A1 * | 3/2019 | Sion | ...................... | G06F 16/21 |

(Continued)

FOREIGN PATENT DOCUMENTS

EP      3607485 B1      7/2020

OTHER PUBLICATIONS

B. Applebaum, D. Cash, C. Peikert, and A. Sahai "Fast cryptographic primitives and circular-secure encryption based on hard learning problems." In: Crypto. 2009, pp. 595-618, 2009.

(Continued)

*Primary Examiner* — J. Brant Murphy

(74) *Attorney, Agent, or Firm* — Kagan Binder, PLLC

(57) ABSTRACT

A method for distributed and private symmetric searchable encryption includes receiving encrypted data, creating a search index for one or more servers based on the encrypted data using a distributed point function (DPF), splitting the encrypted data into a number of portions based on the number of servers, and partitioning the servers into two or more groups. The method also includes updating the search index based on the splitting and the partitioning, transmitting the split encrypted data to the servers based on the updated search index, verifying the transmitted data using data not transmitted to the server, and determining, based on the verifying, whether any server deviated from an assigned protocol.

20 Claims, 7 Drawing Sheets

(56) References Cited

U.S. PATENT DOCUMENTS

2019/0278939 A1* 9/2019 Fan ..................... G16H 10/60
2020/0175192 A1* 6/2020 Yeo .................... G06F 21/6227
2020/0304293 A1* 9/2020 Gama .................. G06F 17/16

OTHER PUBLICATIONS

D. Boneh, G. Di Crescenzo, R. Ostrovsky, and G. Persiano. "Public Key Encryption with keyword search." In: Eurocrypt. 2004, 15 pages, 2004.

Christoph Bosch, Qiang Tang, Pieter Hartel, and Willem Jonker. "Selective Document Retrieval from Encrypted Database." In: International Conference on Information Security. 2012, pp. 224-241, 2012.

Elette Boyle, Niv Gilboa, and Yuval Ishai. "Function Secret Sharing." In: Eurocrypt. 2015, pp. 337-367, 2015.

Yan Cheng Chang and Michael Mitzenmacher. "Privacy Preserving Keyword Searches on Remote Encrypted Data." In: Applied Cryptography and Network Security. 2005, pp. 442-455, 2005.

Reza Curtmola, Juan Garay, Seny Kamara, and Rafail Ostrovsky. "Searchable symmetric encryption: improved definitions and efficient constructions." In: ACM conference on Computer and communications security. 2006, pp. 79-88, 2006.

Gilboa et al., "Distributed Point Functions and their Applications" In: Eurocrypt, pp. 640-658, 2015.

Eu-Jin Goh. "Secure Indexes." In: In submission. 18 pages, Mar. 16, 2004.

Oded Goldreich and Rafail Ostrovsky. "Software Protection and Simulation on Oblivious RAMs." In: Journal of the ACM (JACM) 43.3 (1996), pp. 431-473, May 1996.

Mohammad Saiful Islam, Mehmet Kuzu, and Murat Kantarcioglu. "Access Pattern disclosure on Searchable Encryption: Ramification, Attack and Mitigation." In: NDSS, The Internet Society. 15 pages, 2012.

Seny Kamara and Charalampos Papamanthou. "Parallel and Dynamic Searchable Symmetric Encryption." In: Financial Cryptography and Data Security, pp. 258-274, 2013.

Seny Kamara, Charalampos Papamanthou, and Tom Roeder. "Dynamic searchable symmetric encryption." In: CCS. 24 pages, 2012.

Kaoru Kurosawa and Yasuhiro Ohtaki. "UC-Secure searchable symmetric encryption." In: Financial Cryptography and Data Security, pp. 285-298, 2012.

Peter van Liesdonk, Saeed Sedghi, Jeroen Doumen, Pieter Hartel, and Willem Jonker. "Computationally Efficient Searchable Symmetric Encryption." In: Workshop on Secure Data Management, pp. 87-100, 2010.

Chang Liu, Liehuang Zhu, Mingzhong Wang, and Yu An Tan. Search Pattern Leakage in Searchable Encryption: Attacks and New Construction. Information Sciences: an International Journal, 28 pages, Dec. 4, 2013.

R. Ostrovsky. "Efficient computation on oblivious RAMs." In: STOC. 1990, pp. 514-523.

Rafail Ostrovsky. "Software Protection and Simulations on Oblivious RAMs." PhD thesis. MIT, 72 pages, May 17, 1992.

Emily Shen, Elaine Shi, and Brent Waters. "Predicate Privacy in Encryption Systems." In: Theory of Cryptography. 18 pages, 2009.

Dawn Xiaodong Song, David Wagner, and Adrian Perrig. "Practical techniques for searches on encrypted data." In: IEEE Symposium on Security and Privacy. 12 pages, 2000.

* cited by examiner

SEARCH AND ACCESS PATTERN HIDING VERIFIABLE SEARCHABLE ENCRYPTION FOR DISTRIBUTED SETTINGS WITH MALICIOUS SERVERS

BACKGROUND

Searchable encryption allows a data owner to store encrypted data at an untrusted server, and later search the data, in its encrypted form, for records (or documents) matching a search query, such as a given keyword.

A problem exists in the art in that existing searchable encryption schemes fail to adequately hide the search results from the servers hosting the encrypted data and conducting the search on the encrypted data. This raises fundamental issues regarding privacy and information leakage since the server can infer or deduce information about the data owner's queries by recording the frequency of same search results and document retrievals. Furthermore, another problem exists in the art in that existing searchable encryption schemes fail to guarantee correctness of the search results and provide privacy. This includes privacy related to the data owner's search patterns in the presence of potentially malicious servers.

Hence, there is an urgent need to solve the above problems and to enhance the privacy and correctness guarantees of searchable encryption hosted by third party servers.

SUMMARY

Aspects of the invention described herein are directed to searchable encryption schemes that guarantee privacy, both in terms of access and search patterns, and correctness in the presence of malicious servers.

Disclosed herein are solutions to problems that exist in the art. Also disclosed herein are constructs for the first searchable encryption that is both search pattern hiding and verifiable. The presently disclosed scheme provides information theoretic security, i.e., it is unconditionally secure. Furthermore, the schemes disclosed herein rely on established and mathematical constructs.

According to a first aspect of the present disclosure, a method for distributed and private symmetric searchable encryption is disclosed. According to the first aspect, the method includes receiving encrypted data. The method also includes creating a search index for one or more servers based on the encrypted data using a distributed point function. The method also includes splitting the encrypted data into a number of portions based on the number of servers. The method also includes partitioning the servers into two or more groups. The method also includes updating the search index based on the splitting and the partitioning. The method also includes transmitting the split encrypted data to the servers based on the updated search index. The method also includes verifying the transmitted data using data not transmitted to the server. The method also includes determining, based on the verifying, whether any server deviated from an assigned protocol.

According to a second aspect, a system is disclosed. According to the second aspect, the system includes a hardware processor operatively coupled to a memory where the hardware processor is configured to execute instructions stored on the memory, including instructions for a process for improving data security or privacy in a computing environment. The process includes receiving encrypted data. The process also includes creating a search index for one or more servers based on the encrypted data using a distributed point function. The process also includes splitting the encrypted data into a number of portions based on the number of servers. The process also includes partitioning the servers into two or more groups. The process also includes updating the search index based on the splitting and the partitioning. The process also includes transmitting the split encrypted data to the servers based on the updated search index. The process also includes verifying the transmitted data using data not transmitted to the servers. The process also includes determining, based on the verifying, whether any server deviated from an assigned protocol.

According to a third aspect, a computer program product for improving data security or privacy is disclosed. According to the third aspect, the computer program product includes a computer-readable storage medium having program code embodied therewith, the program code comprising computer-readable program code configured to cause a processor to perform steps that include receiving encrypted data. The steps also include creating a search index for one or more servers based on the encrypted data using a distributed point function. The steps also include splitting the encrypted data into a number of portions based on the number of servers. The steps also include partitioning the servers into two or more groups. The steps also include updating the search index based on the splitting and the partitioning. The steps also include transmitting the split encrypted data to the servers based on the updated search index. The steps also include verifying the transmitted data using data not transmitted to the servers. The steps also include determining, based on the verifying, whether any server deviated from an assigned protocol.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
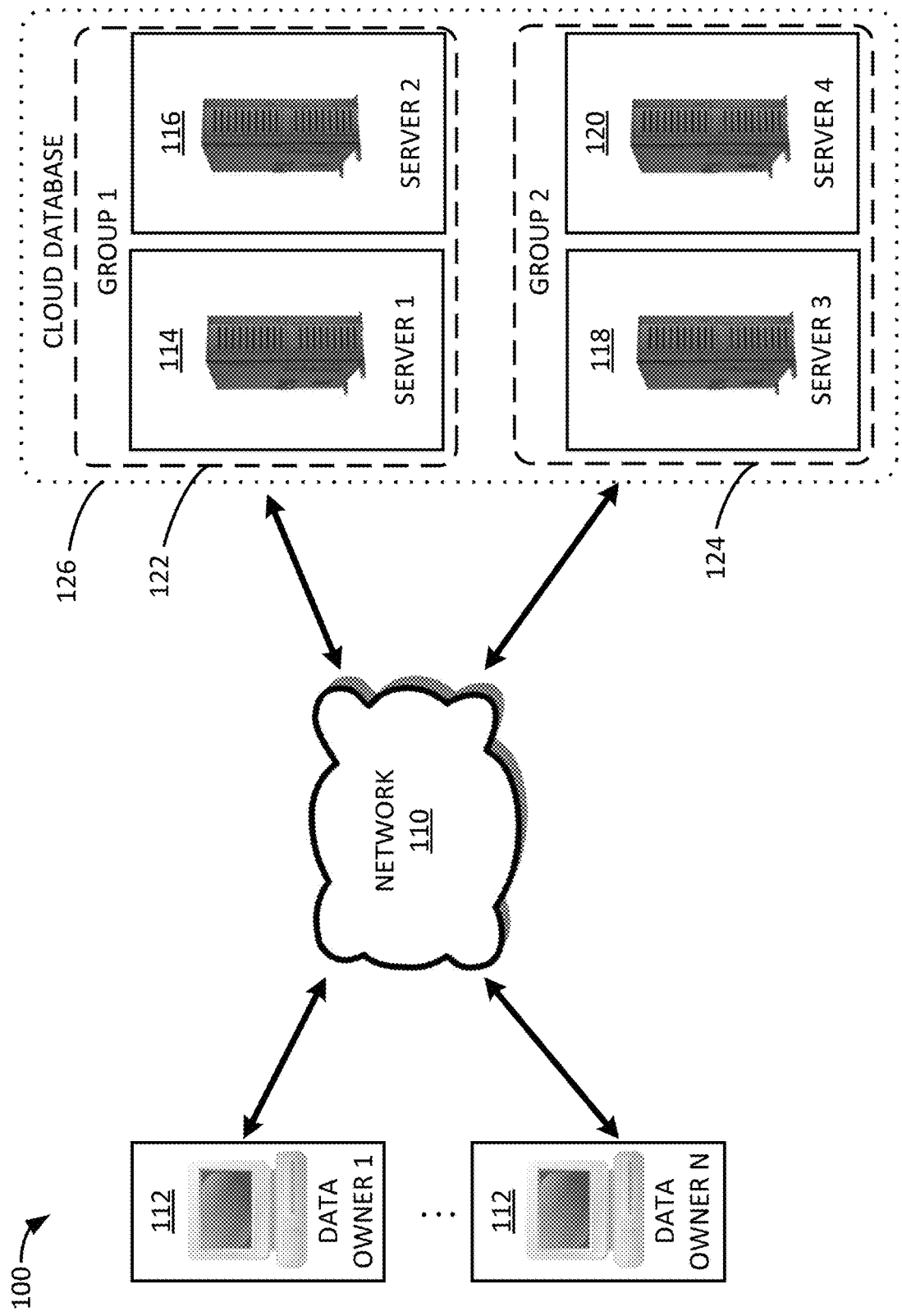
FIG. 1 is a computing environment, according to various embodiments.

Distributed point functions (DPFs) are functions used in cryptographic schemes that permit two distributed processes or parties to share a piece of information and to compute functions of their shared information without revealing the information itself to the other process or party. DPFs typically utilize the XOR operator, ($\oplus$ or "bitwise exclusive OR") whereby the DPF is zero everywhere except for a single point at which the DPF is non-zero. Each party is therefore provided a key that is indistinguishable from random without the other key provided to the other party. If a DPF is known, it is therefore possible to perform private information retrieval.

The methods and features described herein are applicable to searchable encryption schemes carried out in various computing environments. In particular, embodiments are directed to searchable encryption schemes based on DPFs in which a data owner wishes to perform a search to encrypted data hosted by a third party server. Efficient searching at the server of the data owner's plaintext is optimal, while avoiding the server access to the plaintext being queried. The data owner can also desire to prevent the potentially dishonest or malicious third party server hosting the encrypted data being searched from deducing various aspects or keywords used in user (e.g., data owner also used interchangeably herein) searches over encrypted data handled by the server and search results returned to the data owner. The server can comprise or be a part of a cloud database as is known in the art.

The following references are referred to in the present application. Each reference below is incorporated by reference in its entirety. The incorporated references are referred to below and throughout herein based on the author(s) name(s) and numerical identifier provided below.

Reference [1]: B. Applebaum, D. Cash, C. Peikert, and A. Sahai. "Fast cryptographic primitives and circular-secure encryption based on hard learning problems." In: *CRYPTO.* 2009, pp. 595-618.

Reference [2]: D. Boneh, G. Di Crescenzo, R. Ostrovsky, and G. Persiano. "Public key encryption with keyword search." In: *Eurocrypt.* 2004.

Reference [3]: Christoph Bosch, Qiang Tang, Pieter Hartel, and Willem Jonker. "Selective Document Retrieval from Encrypted Database." In: *International Conference on Information Security.* 2012, pp. 224-241.

Reference [4]: Elette Boyle, Niv Gilboa, and Yuval Ishai. "Function Secret Sharing." In: *Eurocrypt.* 2015.

Reference [5]: Yan Cheng Chang and Michael Mitzenmacher. "Privacy Preserving Keyword Searches on Remote Encrypted Data." In: *Applied Cryptography and Network Security.* 2005, pp. 442-455.

Reference [6]: Reza Curtmola, Juan Garay, Seny Kamara, and Rafail Ostrovsky. "Searchable symmetric encryption: improved definitions and efficient constructions." In: *ACM conference on Computer and communications security.* 2006, pp. 79-88.

Reference [7]: Reza Curtmola, Juan Garay, Seny Kamara, and Rafail Ostrovsky. "Searchable symmetric encryption: improved definitions and efficient constructions." In: *13th ACM conference on Computer and communications security.* 2006.

Reference [8]: Niv Gilboa and Yuval Ishai. "Distributed Point Functions and Their Applications." In: *Eurocrypt.* 2014.

Reference [9]: Eu-Jin Goh. "Secure Indexes." In: *Cryptology ePrint Archive, Report* 2003/216 (2003). url: http://eprint.iacr. org/2003/216/.

Reference [10]: Eu-Jin Goh. "Secure Indexes." In: *In submission.* 2004.

Reference [11]: Oded Goldreich and Rafail Ostrovsky. "Software protection and simulation on oblivious RAMs." In: *Journal of the ACM (JACM)* 43.3 (1996), pp. 431-473.

Reference [12]: Mohammad Saiful Islam, Mehmet Kuzu, and Murat Kantarcioglu. "Access Pattern disclosure on Searchable Encryption: Ramification, Attack and Mitigation." In: *NDSS, The Internet Society.* 2012.

Reference [13]: Seny Kamara and Charalampos Papamanthou. "Parallel and Dynamic Searchable Symmetric Encryption." In: *Financial Cryptography and Data Security.* 2013, pp. 258-274.

Reference [14]: Seny Kamara, Charalampos Papamanthou, and Tom Roeder. "Dynamic searchable symmetric encryption." In: *CCS.* 2012, pp. 965-976.

Reference [15]: Kaoru Kurosawa and Yasuhiro Ohtaki. "UC-Secure searchable symmetric encryption." In: *Financial Cryptography and Data Security.* 2012, pp. 285-298.

Reference [16]: Peter van Liesdonk, Saeed Sedghi, Jeroen Doumen, Pieter Hartel, and Willem Jonker. "Computationally Efficient Searchable Symmetric Encryption." In: *Workshop on Secure Data Management.* 2010, pp. 87-100.

Reference [17]: Chang Liu, Liehuang Zhu, Mingzhong Wang, and Yu An Tan. *Search pattern leakage in searchable encryption: Attacks and new construction.* Information Sciences: an International Journal, 2014.

Reference [18]: R. Ostrovsky. "Efficient computation on oblivious RAMs." In: *STOC.* 1990, pp. 514-523.

Reference [19]: Rafail Ostrovsky. "Software Protection and Simulations on Oblivious RAMs." PhD thesis. MIT, 1992.

Reference [20]: Emily Shen, Elaine Shi, and Brent Waters. "Predicate Privacy in Encryption Systems." In: *Theory of Cryptography.* 2009, pp. 457-473.

Reference [21]: Dawn Xiaodong Song, David Wagner, and Adrian Perrig. "Practical techniques for searches on encrypted data." In: *IEEE Symposium on Security and Privacy.* 2000, pp. 44-55.

With reference to FIG. 1, an example computing environment 100 is shown in which one or more data owners 112 communicate electronically with one or more servers 114, 116, 118, and 120 over a computer network 110. The servers 114, 116, 118, and 120 are optionally comprised within a cloud database 126. Furthermore, the servers 114, 116, 118, 120 are optionally partitioned into two or more server groups, such as group 1 (e.g., comprising servers 1 (114) and 2 (116)) and group 2 (e.g., comprising servers 3 (118) and 4 (120)), as shown. Although four servers and two groups are shown, any number of servers and/or groups of the servers are also contemplated herein.

In more detail, a DPF is a type of point function that can be carried out in a computing environment such as computing environment 100 of FIG. 1. In one illustrative example, for x, y∈(element of set) $\{0, 1\}^*$, a point function $P_{x,y}$ is defined as: $P_{x,y}(x)=y$ and $P_{x,y}(x_0)=0^{|y|}$, for all $x' \neq x$. DPFs are discussed in detail in reference [8] above. In DPFs, a point function (e.g., $P_{x,y}$) is divided into keys (shares) which can be separately evaluated and later combined to evaluate the point function. Reference [8] describes an efficient construction of a two-party DPF, under the assumption that a one-way function exists. The key (or share) size of the two-party DPF construction is defined as $O(\lambda \cdot |x|^{log\ 3})$, where $|x|$ is the length of the input of the point function, and where "O" represents a mathematical notation that describes the limiting behavior of a function. In other words, in complexity theory and as used herein notation "O" gives the upper bound on the value of the function up to a constant factor.

The DPF construction uses a pseudorandom generator (PRG) G to reduce the share length. A PRG provides a random sequence of results (e.g., numbers) in a way that is both random but also reproducible and/or verifiable if the PRG is copied and reinitiated in a second instance.

Two-party DPF construction provides a generation algorithm "Gen," which given a point function generates its two shares (keys), e.g., $k_0$ and $k_1$. A second algorithm, "Eval," is used to evaluate the two DPF shares and the final result is computed as: $\text{Eval}(k_0, x', |y|)$ logic exclusive OR (XOR) $\text{Eval}(k_1, x', |y|) = P_{x,y}(x')$. Gilboa and Ishai in reference [8] describe that given a PRG G, the DPF shares of length 1, generated by Gen are computationally indistinguishable from a uniform distribution on strings of length l. Similarly, if G is an exponentially strong PRG then so is the DPF. Byole et al. in reference [4] gives an improved two-party DPF construction and reduced the DPF share size from $O(\lambda \cdot |x|^{log\ 3})$ to $O(\lambda \cdot |x|)$. Improved searchable encryption schemes are discussed herein. In order to ensure secrecy of the data whose storage is outsourced to a third party server, the data owner should encrypt it as that protects against security and/or privacy related risks. But, up to now, searching over encrypted data has typically been difficult if not impossible. In order to search over encrypted data, the data owner typically downloads the data, decrypts it, and performs the search locally and separate from the third party servers. This option is impractical and/or inefficient in most cases. Another option is to provide the potentially non-trustworthy server(s) with the decryption key, which would defeat the purpose of encryption. Alternatively, the server(s) can be permitted to search over the encrypted data, on behalf of the data owner, without leaking any information about the plaintext.

Figure 2:
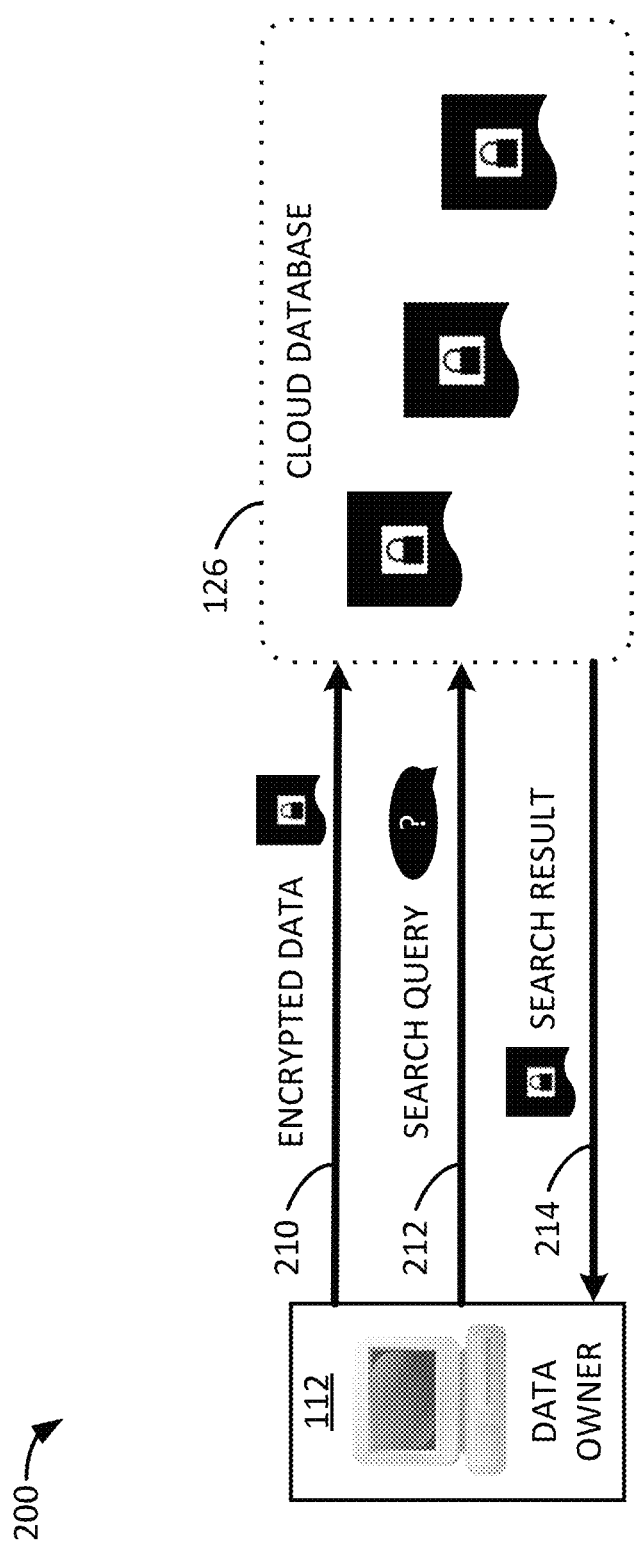
FIG. 2 schematically shows a searchable encryption scheme, according to various embodiments.

More generally, cryptographic schemes that enable searching over encrypted data are called searchable encryption (SE) schemes. FIG. 2 gives a graphical depiction of a typical SE scheme at 200 carried out in a computing environment (e.g., 100), where the data owner 112 stores encrypted data on an untrusted third party server at operation 210 (cloud database 126) such that the data owner 112 can query the encrypted database at operation 212 without any need to decrypt the data. The results are returned in encrypted form to the data owner at operation 214, which the data owner 112 can read since it knows and/or possesses the (secret) encryption key.

Searchable symmetric encryption (SSE), further discussed in reference [21], uses a secure index to allow the data owner to store encrypted data at an untrusted (and therefore potentially malicious) server such that it can later search the data for records (or documents) matching a given keyword. In particular, SSE allows for situations where an entire database is not desired to be encrypted, so an index is used for more common keywords and the like. This allows a user-friendly and performance-enhancing setups without significant user involvement. For example, the user can provide an index because the user knows which document or file is associated with which keyword, which is provided to same in the encrypted server environment. Preferably, one index is provided and utilized per server.

The problem of searching over encrypted data has been considered by Goldreich and Ostrovsky in references [11, 18, and 19] when cast as a problem of oblivious random access memory (RAM). Song et al. [21] first provided efficient solutions for equality searches and introduced SSE. Since then, several references [1, 5, 6, 9, 13-16, and 21] have provided analysis of SSE and have provided solutions with varying trade-offs between security, privacy and efficiency. Furthermore, SE schemes for asymmetric setting, such as, public key encryption with keyword search as discussed in reference [2] have also been developed. A "search pattern" as discussed in reference [6] is defined as any information that can be derived or inferred about the keywords being searched from the issued search queries (see also FIGS. 2 and 3).

To date, significant weaknesses and shortcomings remain in SE and SSE schemes. One such problem is sometimes referred to as "search pattern leakage," which relates to the search pattern concept above. Various embodiments of the present disclosure address and substantially solve the search pattern leakage issue that exists in the art. Embodiments also address and solve other shortcomings in the existing art.

Figure 3:
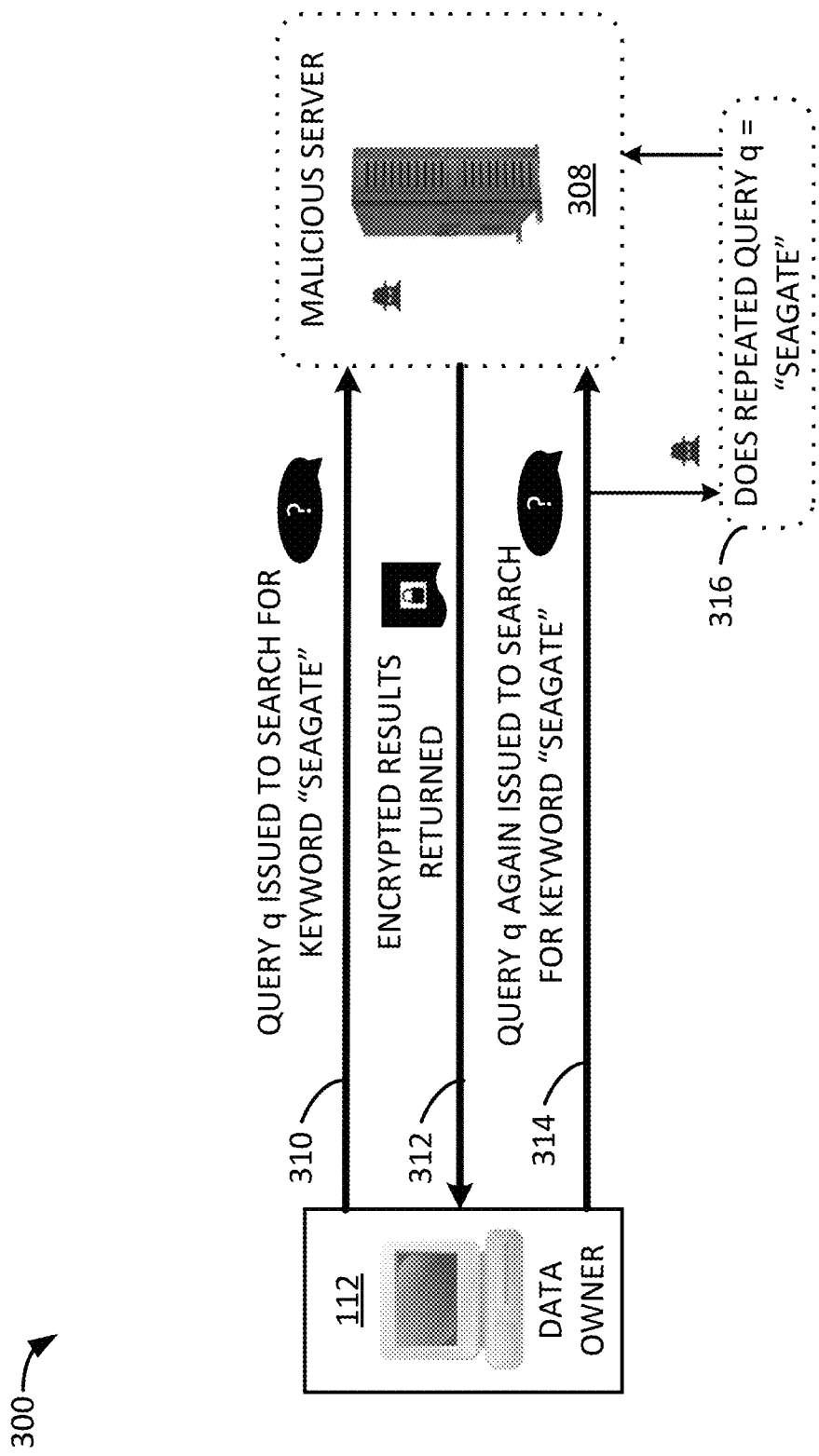
FIG. 3 schematically shows search pattern leakage, according to various embodiments.

FIG. 3 illustrates a simplified example 300 of search pattern leakage in searchable encryption, wherein the "malicious" server 308 can infer and/or deduce with a high probability that the search being performed by the data owner 112 includes the keyword "Seagate."

In particular, data owner (or party) 112 is in communication with a malicious server 308. The data owner at operation 310 sends a query "q" to the server 308 to search for a keyword "Seagate." The query q is encrypted when sent at 310, but the server receives the query and analyzes it as possible. The server then performs the requested search based on query q and returns the encrypted results to data owner 112 at operation 312. However, if the data owner at operation 314 again searches based on the same (or similar) query q, the server 308 can begin to deduce what the data owner is seeking at operation 316. For instance, the server 308 at operation 316 may speculate or deduce that the data owner 112 is searching for a common or predictable, e.g., alphanumeric, keyword, such as "Seagate." More repetitions of certain queries and/or keywords may therefore lead to a discernable pattern and greater probability that the malicious server 308 can successfully deduce the nature of the unencrypted search term.

Therefore, existing SE schemes have a tendency to leak search patterns to the potentially malicious server(s), e.g., malicious server 308. Shen et al. in reference [20] introduced the concept of predicate privacy, which was furthered by Bosch et al. in reference [3] to develop an efficient search pattern hiding SSE scheme. Other search pattern hiding SE schemes rely on false queries and/or false positive search results as discussed in references [12 and 17].

As discussed above, no existing SE scheme hides the search results from the servers hosting the encrypted data and conducting the search. This raises fundamental problems regarding privacy and information leakage since the server (308) can infer or deduce information about the user's (data owner's 112) queries by recording the frequency or patterns of same search results and document retrievals. Furthermore, no existing SE scheme guarantees correctness of the search results in the presence of one or more malicious servers 308.

In order to address the existing shortcoming in the art, and in order to provide a SE scheme that is both search-pattern hiding and verifying, the present disclosure provides constructs improved and unconditionally secure features, which leverage existing established mathematical constructs in beneficial and heretofore unknown and previously counterintuitive ways.

The participants in a single-user (e.g., data owner 112 who stores its data on third-party server and wishes to search over it efficiently and securely) SE scheme include a client (data owner 112) that wants to store a private document collection (e.g., data) $D = (D_1, \ldots, D_n)$ on third party servers (e.g., server 308), which may be actively dishonest (e.g., malicious).

Third party servers can potentially be either semi-honest in which they attempt to determine information, patterns, etc. or can be malicious, in which the server 308 may actually deviate from its requested functions in order to attempt to access or decipher unauthorized and/or encrypted data it hosts. Therefore, the data owner 112 wants to store the private document collection D on the third party servers 308 such that (1) the servers do not learn any useful information about the encrypted data, and that (2) the servers can search through the D and return the appropriate (encrypted) documents to the data owner 112 without knowing the result of the search.

As used herein, a "negligible function" can be defined as follows: For a security parameter $\omega$, a function $\epsilon(\omega)$ is called negligible if for all c>0, there exists a $\omega_0$ such that $\epsilon(\omega)<1/\omega^c$ for all $\omega>\omega_0$.

Further, new definitions can also be provided as described herein. According to a first new definition used in this disclosure, a distributed and private searchable symmetric encryption (DPSSE) scheme is defined for n ($\geq 2$) servers (e.g., four servers 114-120) and a client (data owner 112), such that all the servers must participate for keyword search. As contemplated herein, a single honest (i.e., neither malicious nor semi-honest) server can provide comparable benefits to each server being honest. This is because even DPFs provide randomness that cannot be easily solved without all or multiple parties collaborating to solve the encryption. A PRG can be used by each server to provide reproducible, traceable randomness as discussed herein.

An example DPSSE scheme is a suite of six algorithms, that are executed between the data owner and the servers, with, for example, the following specifications:

$\mathbb{K} \leftarrow$Keygen($1^k$) is defined as a probabilistic key generation algorithm, that is performed by the data owner in collaboration with the servers. It takes a security parameter k, and returns a set, K, of n secret keys, such that the length of each K, E K is polynomially bounded in k.

I$\leftarrow$PartialIndex ($\mathbb{K}$, $\mathcal{D}$, W) is defined as a probabilistic algorithm run by the data owner 112 to generate indexes (also known as "indices") for the given keywords and documents. In some embodiments, indexes can be related or interrelated, and a single index can have multiple subindexes. It takes the set K of n secret keys along with a document collection D and a keyword collection W, each of which is polynomially bounded in k. It returns a partial index I, such that the length of I is polynomially bounded in k, and no polynomial-time adversary has non-negligible advantage in distinguishing I from a truly random index.

$T_w[i]\leftarrow$Trapdoor ($K_i$, $\omega$) is performed by the user to generate a trapdoor for the keyword w, for server $S_i$. It takes the server's secret key $K_i$ and the keyword w as inputs, and returns a (random) trapdoor $T_w[i]$. As used herein a trapdoor is a "key" that allows for a grant of limited access (i.e., less complete and unrestricted access than a backdoor) to a challenging problem in one instance.

$\mathcal{D}_\omega[i]\leftarrow$Search($T_\omega[i]$) is run by the server S, in order to search for the documents in D, that contain the keyword w. It takes as input a (random) trapdoor $T_w[i]$, that allows $S_i$ to search for the keyword w. The function returns a partial result, $D_w[i]$, which is $S_i$'s share of the set of identifiers, $D_w$, of the documents that contain w.

$\mathcal{D}_\omega\leftarrow$Combine ($\mathbb{D}_\omega$) combines the set of partial results, $D_w=\{D_w[1],\ldots,D_w[n]\}$, from the n servers, to generate the final search result, $D_w$, for keyword w, which is a list of document identifiers for the documents that contain w.

accept/reject$\leftarrow$Verify($\mathcal{D}_w$, $\omega$, $\mathbb{T}_\omega$) is a Boolean deterministic verification algorithm, which checks the validity of the search result $D_w$, generated by function Combine($D_w$), for keyword w.

A security definition for disclosed DPSSE schemes can be provided by an example of an "attack game" in which the security of the DPSSE scheme is tested. As known in the art, an attack game provides a testing protocol in which an "oracle" is provided with a certain level of resources and is tasked with attempting to decrypt and solve the encryption scheme being tested. If the attack game determines that the oracle (e.g., an attacker or adversary A) guesses the solution with a non-negligible advantage, then certain conclusions can be deduced, and certain adjustments can be made accordingly. The attack game can also aid in determining which type of adversary the encryption scheme is secure again.

An example attack game against a DPSSE scheme for n servers and an attacker "A" includes the following three steps (and additional sub-steps).

1. The challenger runs the Keygen algorithm and obtains a set, K=$\{k_1, k_2, \ldots, k_n\}$, of n secret keys. The challenger picks a random bit b.

2. The attacker "A" adaptively makes one or more of the following types of queries (a-c).

a. An index oracle query. Attacker A provides two documents, $D_0$, $D_1$. The challenger returns partial index $I_b$=PartialIndex(K,$D_b$).

b. A trapdoor oracle query. A provides two keywords, $w_0$ and $w_1$, a list, E, of at most n-1 servers. For each $S_i \in E$, the challenger returns: $T_{wb}[i]$=Trapdoor($K_i$,$w_b$)

c. A search oracle query. A provides two keywords, $w_0$ and $w_1$, along with two sets, $T_{w0}[E]$ and $T_{w1}[E]$, of their trapdoors, generated for servers $S_i \in E$ ($|E|<n$, i.e., $|T_{w0}|=|T_{w1}|<n$). For each $T_{wb}[i]\in T_{wb}[E]$, the challenger returns: $D_{wb}[i]$=Search($T_{wb}[i]$).

3. A outputs a guess b' for b.

According to embodiments herein, a DPSSE scheme is secure if no probabilistic polynomial-time attacker has non-negligible advantage against it, in the attack game described above, where the advantage is defined as: |Pr[b=b']-½|.

In the presently disclosed DPSSE schemes, a generic framework is introduced to realize DPSSE functionality. As an example solution, proposed is a DPSSE scheme that relies on and is built upon DPFs and uses the DPFs to create search indexes for the servers. Followed by that, in various embodiments DPFs can be replaced with multi-point functions and/or interval functions as discussed in reference [8]. Various embodiments herein discuss examples with four servers, but the number of servers can be any number greater than 1 (i.e., 2 or more servers).

In an example with four servers ($S_1$, $S_2$, $S_3$, and $S_4$), (e.g., corresponding to servers 114, 116, 118, and 120 of FIG. 1) the data owner 112 preferably splits the encrypted data into four portions referred to as data$_1$, data$_2$, data$_3$, and data$_4$. Servers ($S_1$, $S_2$, $S_3$, and $S_4$) are used to store the data, and the data owner 112 sends data, to server $S_i$ ($1 \leq i \leq 4$). Note that the data owner 112 may choose all data portions to be empty, i.e., it may store the whole data at a single server, but it is the search index is to be shared among the four servers. The four servers are also divided or "partitioned" into two server sets or "groups": Ser$_1$=$\{S_1, S_2\}$ and Ser$_2$=$\{S_3, S_4\}$. Data owner 112 creates two shares of the search index and sends them to the appropriate servers. An example of an initial setup and DPF share distribution is explained in greater detail below. In some example, two servers could combine or share their respective results, e.g., to reverse-engineer the results. However, according to the present disclosure, even one non-colluding (e.g., non-malicious; honest) server would provide for a secure encryption scheme.

Various further notations as used herein as follows: StrongDPFindex: An algorithm to generate the server side index. StrongDPFtrap: A trapdoor is generated by StrongDPFindex during index generation, but to avoid ambiguity StrongDPFtrap is used to represent the trapdoor generating function.

Figure 4:
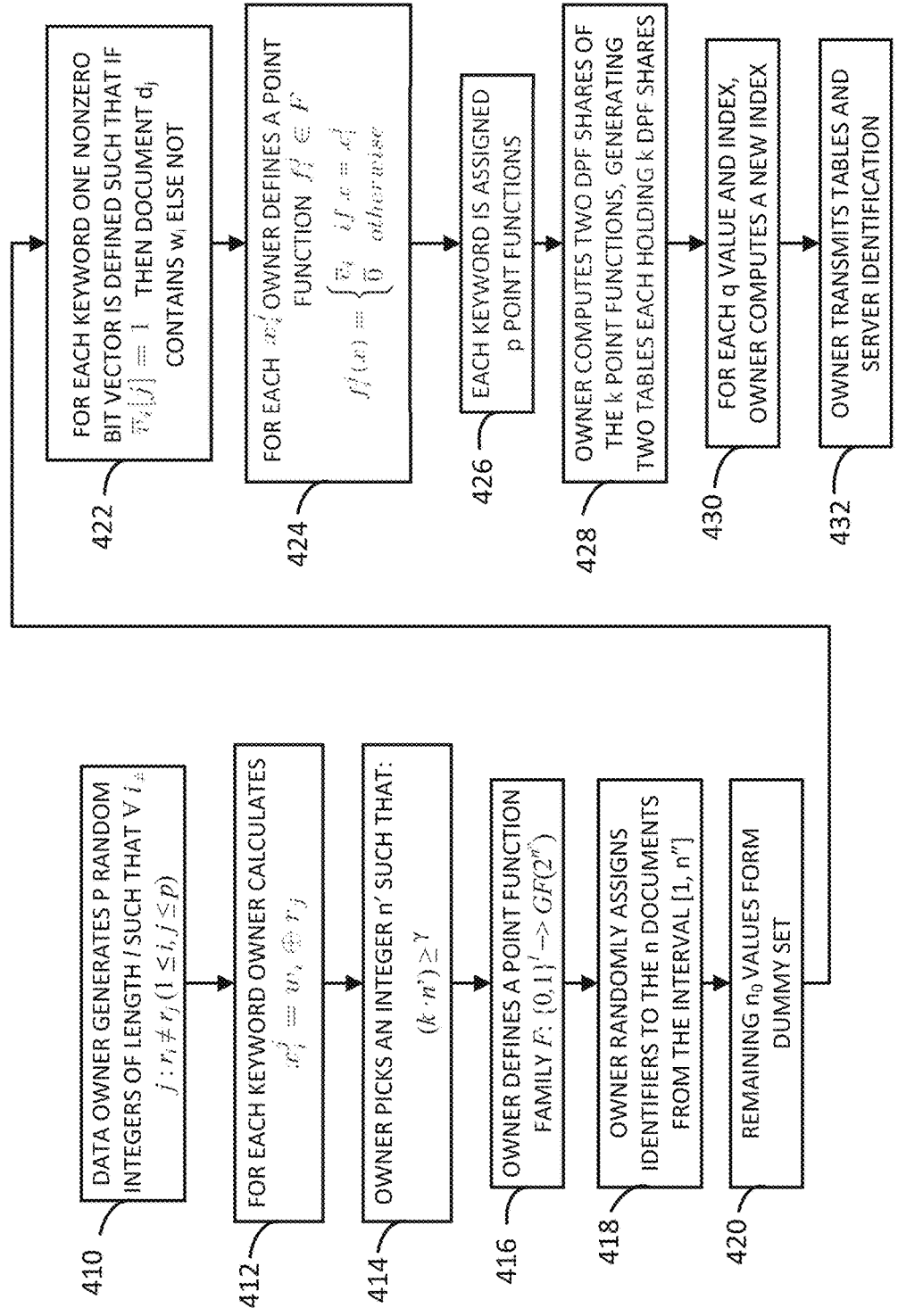
FIG. 4 is a flowchart for a strong data point function search setup protocol, according to various embodiments.

Now, and with reference in particular to FIG. 4, an example Strong DPF Search Setup Protocol computer-implemented process 400, according to various embodiments is detailed as follows.

At step 1 (410), data owner (e.g., data owner 112 as described herein) generates p (>1) random integers $(r_1, \ldots, r_p)$ of length l such that: $\forall i \neq j: r_i \neq r_j$ ($1 \leq i, j \leq p$). At step 2 (412), for each keyword $w_i$, the owner calculates: $x_i^j = \omega_i \oplus r_j$. Therefore, both i and j are both integers between 1 and p. This provides for distinguishing between different values, comparing the indexes with each other, capturing, and/or determining whether both indexes are unique. At step 3 (414), data owner picks an integer n' such that: $(k \cdot n') \geq \gamma$. Where $\gamma$ is the security parameter that decides the probability of identifying the dishonest server(s). At step 4 (416), the data owner defines a point function family F: $\{0,1\}^l \rightarrow GF(2^{n''})$, where n''=n+n'. Thus, the point functions take a keyword as input and output a bit vector of length n''. Note that a $0^{n''}$ is the identity element in the abelian group $GF(2^{n''})$. At step 5 (418), the data owner randomly assigns identifiers to the n documents from the interval [1, n'']. Then document identifiers represent an entry in the bit vector "$\bar{v}$" $\in GF(2^{n''})$, for example if a document gets an identifier j then the $j^{th}$ entry of the output bit vectors will represent the keyword search result of that document. At step 6 (420), the remaining n' values form the set Dumi. These vector entries do not represent any document identifier but are dummy entries, which evaluate to '0' for all point functions ($\in F$) and all valid inputs. At step 7 (422), for each keyword $w_i$, one nonzero bit vector $\bar{v}_i$ is defined, such that if $\bar{v}_i[j]=1$ then document $d_j$ contains $w_i$, else not. At step 8 (424), for each $x_i^j$, the data owner defines a point function $f_i^j \in F$.

$$f_i^j(x) = \begin{cases} \bar{v}_i & \text{if } x = x_i^j \\ \bar{0} & \text{otherwise} \end{cases}$$

At step 9 (426), therefore, each keyword is assigned or associated with p point functions ($\{f_i^1, f_i^j, \ldots, f_i^p\} \in F$). At step 10 (428), the data owner computes two DPF shares of the k point functions defined for each $r_q$ value. The data owner randomly selects an $r_q$ value as described below. This step generates two tables $T_{Ser_1^q}$ and $T_{Ser_2^q}$, each holding k DPF shares. At step 11 (430), for each q value and each index i, the data owner computes a new index $i' \leftarrow Per(i \oplus r_q)$. The DPF share of $f_i^q$ is stored at index i' in tables $T_{Ser_1^q}$ and, i.e., the data owner permutes all tables holding the DPF shares. Finally, at step 12 (432), the data owner transmits $T_{Ser_i^q}$ and $Ser_i^q$ ($i \in \{1, 2\}$) where i represents server identifier (ID) and q is the number of values. Following the setup as shown in FIG. 4, a search protocol process can proceed.

Figure 5:
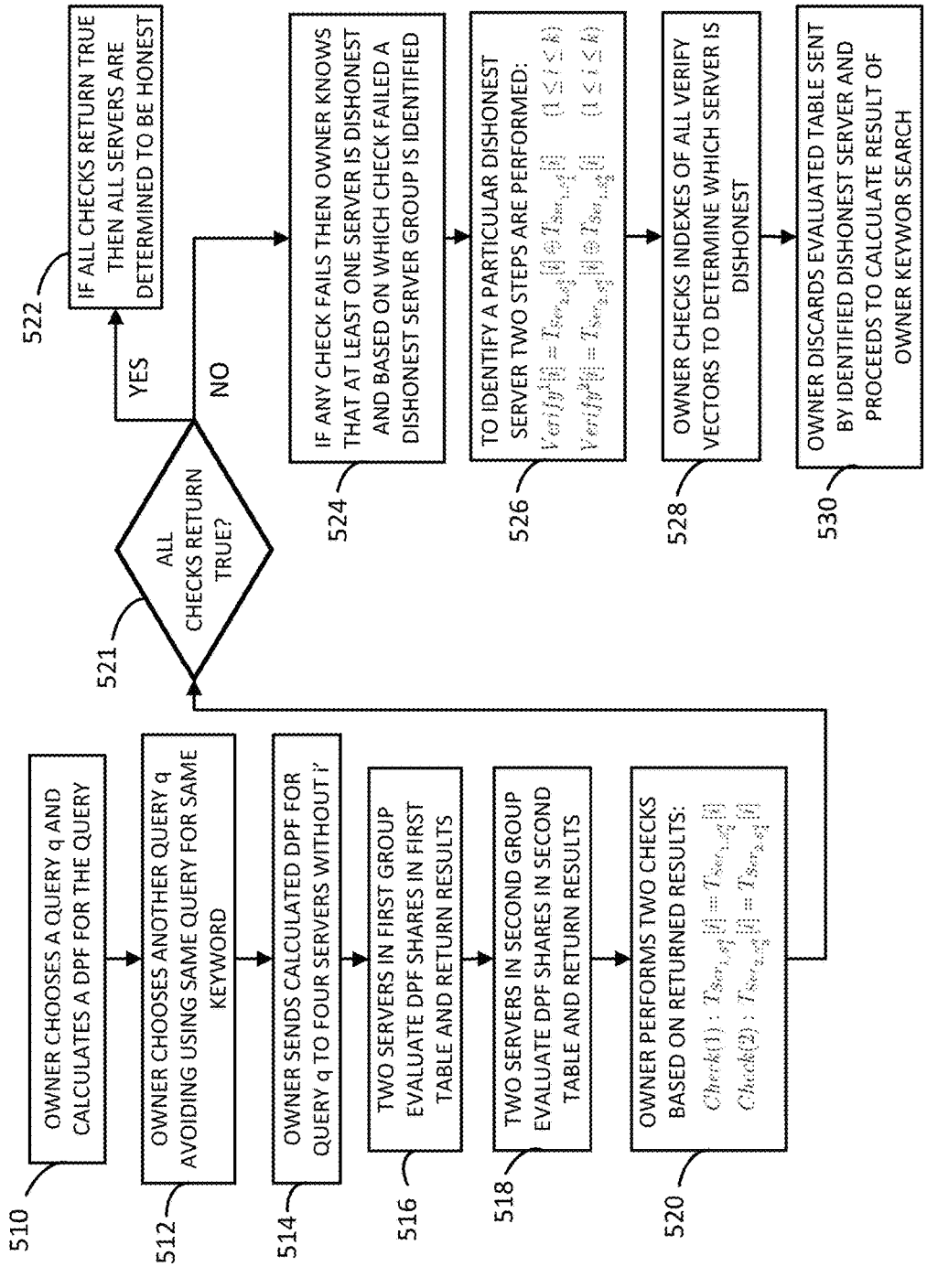
FIG. 5 is a flowchart for a strong data point function search protocol, according to various embodiments.

With reference now to FIG. 5, an example Strong DPF Search Keyword Search Protocol computer-implemented process 500 is shown. For example, the data owner can perform a keyword search, such as: a "StrongDPFsearch," which allows one out of the example four servers to be dishonest, i.e., that server may provide wrong DPF share evaluation result or refuse to participate in the requested keyword search. Note that at most one dishonest server implies that at least one set, $Ser_1$ or $Ser_i$ has only honest servers.

An example process of a keyword search as contemplated herein is explained below:

At step 1 (510), and to search for a keyword w the data owner chooses a query $q \xleftarrow{\$} [1,p]$ and calculates: $x_i^q = \omega_i \oplus r_q$, which is to randomize the query so that search patterns remain hidden. At step 2 (512), if the data owner wishes to hide the search pattern form the servers then it should not use same q value for any keyword. To be most efficient and practical, the data owner may reuse a q value at most t times for the same keyword, where the small the t value the more secure the search will be. At step 3 (514), the data owner sends $<x_i^q, q>$ to the four servers. The data owner does not send i' as part of the initial queries in order to accurately identify the dishonest server (more detail on this herein). Once the dishonest server has been identified, the data owner sends queries of the form $<x_i^q, q, i'>$ and the servers only evaluate the entry of tables $T_{Ser_1^q}$ and $T_{Ser_2^q}$. At step 4 (516), servers $S_1$ and $S_2$ evaluate the DPF shares in table $T_{Ser_1^q}$ and return the results, $$\left(T_{Ser_{1,S_1^q}} \text{ and } T_{Ser_{1,S_2^q}}\right)$$

to the data owner. At step 5 (518), similarly, servers $S_3$ and $S_4$ evaluate the DPF shares in table $T_{Ser_2^q}$ and return the results, $$\left(T_{Ser_{2,S_3^q}} \text{ and } T_{Ser_{2,S_4^q}}\right)$$

to the data owner. Therefore, both server groups perform the evaluation. At step 6 (520), For $1 \leq i \leq k$, the data owner performs two checks, e.g., as follows:

$$Verify^1[i] = T_{Ser_{2,S_3^q}}[i] \oplus T_{Ser_{1,S_1^q}}[i] \quad (1 \leq i \leq k)$$

$$Verify^2[i] = T_{Ser_{2,S_3^q}}[i] \oplus T_{Ser_{1,S_2^q}}[i] \quad (1 \leq i \leq k)$$

At step 7 (522), if all checks return true at decision box 521, then all servers operated honestly for the current keyword search. Hence, the data owner XORs the i' (Per $(i \oplus r_q) = i'$) entry of a table from the set $$\left\{T_{Ser_{1,S_1^q}}, T_{Ser_{1,S_2^q}}\right\}$$

with the i' entry of either $$T_{Ser_{2,S_3^q}} \text{ or } T_{Ser_{2,S_4^q}}.$$

The output is a n'' length bit vector $\bar{v}_i$. As the data owner knows which n indexes represent the document identifiers it can decode the result and ask for the required encrypted documents from the appropriate server(s). At step 8 (524), if any check fails at 521, then the data owner knows that one server behaved dishonestly. If Check(1) failed then a server from the set (or group) $Ser_1$ is faulty otherwise ("else") it is a server from set $Ser_2$.

Without loss of generality for the present illustrative example, let the dishonest server belong to $Ser_1$. At step 9 (526), in order to identify the dishonest server, the data owner computes k bit vectors of length n".

$$Verify^1[i] = T_{Ser_{2},S_{3}^{q}}[i] \oplus T_{Ser_{1},S_{1}^{q}}[i] \quad (1 \le i \le k)$$

$$Verfiy^2[i] = T_{Ser_{2},S_{3}^{q}}[i] \oplus T_{Ser_{1},S_{2}^{q}}[i] \quad (1 \le i \le k)$$

At step 10 (528), data owner checks the n' indexes ($\epsilon$Dumi) of all Verify$^1$[i] vectors and if there is any '1' value then the owner concludes that $S_1$ is the dishonest party. Else the owner similarly checks the Verify$^2$[1] vectors. In some embodiments, therefore, if no dishonest party (server) is identified, other parties (servers) are also checked. At step 11 (530), the data owner discards the evaluated table sent by the dishonest server and calculates the result of the keyword search by XORing entry i' of two tables sent by honest servers and the process can end.

The probability of identifying the dishonest server(s) can depend on various factors and is summarized as follows. In one example, the data owner randomly fixes the n' dummy indexes and we know that one DPF share gives no information about the point function or about the other DPF share as discussed in reference [4]. Thus, the n' ($\in$ Dumi) are random to the four servers. Without loss of generality, let $S_1$ be the dishonest party. There is only one (k·n') length bit pattern which when XORed with $$\left(T_{Ser_{2},S_{3}^{q}} \text{ or } T_{Ser_{2},S_{4}^{q}}\right)$$

will give all zeros at the (k·n') dummy entries, and the probability that $S_1$ picks that bit sequence is:

$$Pr(cheat_{S_1}) = \frac{1}{2^{k \cdot n'}}. \text{ As } (k \cdot n') \ge \gamma; \Rightarrow Pr(cheat_{S_1}) \le \frac{1}{2^{\gamma}}$$

With respect to time complexity and efficiency, the time complexity of a keyword search in StrongDPFsearch can be examined as follows. It is known that the time complexity of evaluating one two-party DPF share is $O(\lambda \cdot l)$ per reference [4], where l is the length of the input of the point functions, and $\lambda$ is a seed length of a PRG (or other security parameter as appropriate). For each keyword search, the servers evaluate k two-party DPF shares but only till the dishonest server is identified. Thus, on average the servers evaluate only one DPF share. Therefore, the average server side time complexity of each keyword search is $O(\lambda \cdot l)$.

The data owner computes one XOR operation to generate the query, this step takes O(l) time. The second task for the owner is to check if any server is dishonest and if it is the case then identify the faulty server which requires comparing 2·k·n" bits, this step takes $\theta$(n") time, where $\theta$ signifies that both upper and lower bounds are bounded by n" within some constant factor. The data owner then computes the final result by XORing two n" long bit vectors, this step takes O(n") time. So, the overall time complexity is dominated by the server side time complexity which is $O(\lambda \cdot l)$.

Therefore, the overall time complexity depends on the seed length ($\lambda$) of the PRG used in the DPF construction, and the output length of the point functions. Note that in certain preferred example: n"<<size of the database.

With respect to security and privacy, in this disclosure it is shown that the security for the case when only one point function is defined for each keyword. This naturally extends to the case with p point functions per keyword because each point function is defined independently.

We turn now to information leakage from DPF shares and keyword searches. We know that if DPF share construction algorithm uses a PRG G, then the DPF shares of length len, generated by Gen(x, y) are computationally indistinguishable from a uniform distribution on strings of length len, and if G is an exponentially strong PRG then so is the DPF (see references [4, 8]). We also know that a two-party DPF share leaks no information about the other DPF share or the point function (see references [4, 8]). Hence, prior to a keyword search the servers have no information about the keywords or the plaintext data or the document identifiers. After performing a keyword search for 14) the servers only have their evaluated DPF shares at $x_i^q$ and we know that one evaluated DPF share gives no information about the point function. As the final result is computed by data owner, the servers get no information about the result(s) of the search or the point function(s).

We turn now to search pattern and access pattern leakage. For example, using $r_i$ (1$\le$i$\le$p) values, data owner defines p different point functions for each keyword. To compute a query for keyword $w_i$ data owner randomly selects a $r_q$ value and uses it to compute the query. To completely hide the search pattern data owner must never use the same $r_q$ for any keyword. Thus, to search for same keyword, data owner preferably always or nearly always sends different queries, so, the data owner's search pattern looks random to the third party servers.

As the servers only evaluate one share of each point function they get no information about the result of the keyword search. The data owner computes the final result and then asks for the appropriate documents. Hence, data owner can easily confuse the servers about the access pattern. Also note than the DPF share size is of order $O(\lambda \cdot l)$. So, if the data owner defines p point functions and create p DPF shares for each keyword the overall space overhead of the shares' tables will still be linear in l(keyword length).

Some specific example security standards are now discussed as they relate to the present disclosure.

Two example experiments discussed herein are referred to as the "IND-CKA" and "IND2-CKA" experiments. Each of the example experiments are proof sketches that provide further evidence of the advantages present disclosure. Further extensions are also contemplated, and the IND-CKA and IND2-CKA experiments as discussed herein may be incomplete.

In reference [10], EJ Goh describes two example security standards for secure indexes, namely IND-CKA (Semantic Security Against Adaptive Chosen Keyword Attack) and IND2-CKA (Stronger Semantic Security Against Adaptive Chosen Keyword Attack). Herein, it is first shown that StrongDPFsearch is secure against IND-CKA in the form of a proof and then the proof is extended to cover IND2-CKA. Below the IND-CKA experiment is explained and it is then shown that no information is leaked in any step of the experiment. Then we also show that if an adversary A has non-negligible advantage $\xi$ against StrongDPFsearch in IND-CKA or IND2-CKA experiment then adversary A has same ζ advantage in breaking the security of the DPF constructions given in references [4, 8].

We turn now to the IND-CKA experiment. First, as a setup, adversary A selects a set of documents $\{d_1, d_2, \ldots, d_t\}$ and sends them to challenger C. C creates secure index with one entry for each word present within the given documents. To create the secure index, C first defines a point function for each word $w_i$ present within the given documents. Then C computes two-party DPF shares of each point function, arranges them in two tables such that each table has exactly one DPF share of each point function, and sends one table as the secure index to A.

Queries: A queries C for word $w_i$, and receives trapdoor $T(w_i)$, which is data owner's evaluated DPF share of the point function $f_i$. A uses the trapdoor to search for the keyword $w_i$. A is allowed to make finite number of queries.

Challenge: A selects two new documents $z_0$ and $z_1$, containing words from the same dictionary as the previous documents. The symmetric set difference of $z_0$ and $z_1$ ($z_0 \bowtie z_1$) should not be zero i.e. there should be at least one word which is not common between $z_0$ and $z_1$, and A must not have already queried any keyword in $z_0$ on $z_1$. A sends $z_0$ and $z_1$ to C. The challenger chooses $b \xleftarrow{\$} \{0, 1\}$, and selects $z_b$. C computes the secure index of $z_b$, and sends it to A. The secure index consists of DPF shares of the point functions defined words present in $z_b$. Note that the point functions will output bit vectors of length $n''=2+n'$, as there are only two documents in the database. The challenge for A is to determine b.

Response: A eventually outputs a bit b', representing its guess for b. The advantage of A in winning this game is defined as: $Adv(A)=|Pr[b=b']-\frac{1}{2}|$. Where the probability is computed over A and C's coin tosses.

Claim 1: We claim that if adversary A has a non-negligible advantage ξ against StrongDPFsearch in the IND-CKA experiment, then A has same advantage against the DPF constructions described in references [4, 8].

Proof: To defeat the security of the DPF constructions, the adversary A should be able to compute some information about the point function that is being distributed using DPF. In IND-CKA experiment, A selects two challenge documents and the challenger randomly selects one of those documents, and returns the keyword search index of the words contained within that document.

To break the DPF constructions' security, the adversary A selects challenge document $z_0$ with only one word $w_0$. Similarly, second challenge document $z_1$ also contains only the word $w_1$. The adversary sends $z_0$ and $z_1$ to the challenger, which returns the index of document $z_b$. We know that A computes the correct value of b with probability $\xi+\frac{1}{2}$, but this also gives the keyword $(w_b)$ which is the nonzero point (the only input at which the point function is zero) of the point function. Thus, if the adversary A has non-negligible advantage$_c$ against StrongDPFsearch then it has the same advantage$_c$ against the DPF constructions presented in reference [4, 8].

With reference now to non-adaptive indistinguishability, Curtmola et al. in reference [7] introduced two adversarial models for SE schemes, namely $IND_{SSE,A}$ (Non-adaptive indistinguishability for SSE) and $IND^*_{SSE,A}$ (Adaptive indistinguishability for SSE). Unlike the security definitions given in reference [10], these definitions include security for trapdoors and require that trapdoors leak no information except what can be inferred from the search and access patterns. Before moving on to a proof, non-adaptive indistinguishability is defined herein and adapted according to the StrongDPFsearch scheme.

Definition 5. (History.) Let A be a dictionary and $D \subseteq 2^\Delta$ be document collection over $\Delta$. A q-query history over D is tuple $H=(D, w)$, w is a vector of q keywords.

Definition 6. (Access Pattern.) The access pattern induced by history $H=(D, w)$ is a tuple $\alpha(H)=(D(w_1), \ldots, D(w_q))$.

Definition 7. (Search Pattern.) The search pattern induced by history $H=(D, w)$ is a symmetric binary matrix $\sigma(H)$ such that for $1 \leq i, j \leq q$, the element in the $i^{th}$ row and $j^{th}$ column is 1 if $w_i=w_j$, and 0 otherwise.

Definition 8. (Trace.) The trace induced by history $H=(D, w)$ is a sequence $r(H)=(|D1|, |D2|, \ldots, |Dn|, \alpha(H), \sigma(H))$ comprised of lengths of the documents in D, and access and search patterns induced by H.

Let $A=(A_1, A_2)$, be a non-uniform adversary. In reference [7], the notation used for the probabilistic, non-adaptive indistinguishability experiment is: $IND_{SSE,A}(k)$ where k is the security parameter which is used to generate the secret key that encrypts the index.

The following is a version of the experiment adapted according to a presently disclosed scheme and the corresponding settings.

$IND_{SSE,A}(1^k, 1^p)$ (restriction: $\tau(H_0)=\tau(H_1)$)
Step 1: $(H_0, H_1) \leftarrow \mathcal{A}_1$
Step 2: $b \xleftarrow{\$} \{0, 1\}$
Step 3: parse $H_b$ as $(D_b, w_b)$
Step 4: $(I_b) \leftarrow StrongDPFindex(D_b)$
Step 5: for $1 \leq i \leq q$, $t_{b,i} \leftarrow StrongDPFtrap(w_{b,i})$
Step 6: let $t_b=(t_{b,1}, \ldots, t_{b,q})$
Step 7: $b' \leftarrow \mathcal{A}_2(I_b, t_b)$
Step 8: if b'=b, output 1, else output 0

We say that the index-based SE scheme is secure in the sense of non-adaptive indistinguishability if for all polynomial-size adversaries $A=(A_1, A_2)$, we have: $Pr[IND_{SSE,A}=1] \leq \frac{1}{2}+negl(k \cdot p)$.

It has now been determined that $\tau(H_0)=\tau(H_1)$; thus, if the scheme is secure then knowledge of trace does not allow A to distinguish between the two document collections. In step 4 of experiment $IND_{SSE,A}$, the challenger C generates an index for the document collection $D_b$. For a presently disclosed scheme, an index in $IND_{SSE,A}$ experiment setting is a table with single DPF shares of all point functions (defined for the keywords). In step 6, C provides trapdoors for selected keywords. Trapdoors are the data owner's DPF shares of the point functions, evaluated at their respective nonzero input point (keyword).

Claim 2. We claim that if adversary A has a non-negligible advantage ξ against StrongDPFsearch in $IND_{SSE,A}$ experiment, then it has same$_c$ advantage in breaking the DPF constructions described in references [4, 8].

Proof. The adversary A performs the following steps to generate the nonzero point of the point function, and hence break the DPF constructions.

Step 1: $(H_0, H_1) \leftarrow \mathcal{A}_1$ such that $H_0=(D_0, w_0)$ and $H_1=(D_1, w_1)$
Step 2: $b \xleftarrow{\$} \{0, 1\}$
Step 3: parse $H_b$ as $(D_b, w_b)$
Step 4: $(I_b) \leftarrow StrongDPFindex(D_b)$
Step 5: for $1 \leq I \leq q$, $t_{b,i} \leftarrow StrongDPFtrap(w_{b,i})$
Step 6: let $t_b=(t_{b,1}, \ldots, t_{b,q})$
Step 7: $b' \leftarrow \mathcal{A}_2(I_b, t_b)$. Note that the adversary A computes b'=b, with probability $\xi+\frac{1}{2}$.
Step 8: Output b'. With probability $\xi+\frac{1}{2}$, b' gives the nonzero points $(w_{b,i})$ of all point functions used to generate $I_b$ and $t_b$. Thus, the adversary A breaks the DPF constructions without requiring any additional steps.

Embodiments of the present disclosure also provide for adaptive indistinguishability. As used herein, an adaptive indistinguishability security definition provides more power to adversary A. Challenger C begins by flipping a coin b. A first submits two document collections ($D_0, D_1$), subject to some constraints which we describe below, and receives the index of $D_b$. Then A submits two keywords ($w_0$, $w_1$) and receives the trapdoor of one of the words $w_b$. This process goes on until the adversary has submitted polynomial number of queries, and eventually A outputs the challenge bit b. The constraint on the documents and keywords is: $\tau$ ($D_0$, $w_{0,1}, \ldots, w_{0,q}$)=$\tau$ ($D_1, w_{1,1}, \ldots, w_{1,q}$).

As with the non-adaptive definition we adapted the experiment of adaptive indistinguishability according to StrongDPFsearch. The adversary is defined as: A=($A_0, \ldots, A_{q+i}$). The probabilistic algorithm for adaptive indistinguishability is defined as:

$IND^*_{SSE,A}(1^k, 1^p)$

Step 1: $b \xleftarrow{\$} \{0, 1\}$
Step 2: ($D_0, D_1$)←$A_0$
Step 3: $I_b$←StrongDPFindex($D_b$)
Step 4: ($w_{0,1}, w_{1,1}$)←$A_1(I_b)$
Step 5: $t_{b,i}$←StrongDPFtrap($w_{b,i}$)
Step 6: for 2≤i≤q ($w_{0,i}, w_{1,i}$)←$A_i(I_b, t_{b,1}, \ldots, t_{b,i-1}$)
Step 7: let $t_b = (t_{b,1}, \ldots, t_{b,q})$
Step 8: $b'$←$A_{q+1}(I_b, t_b)$
Step 9: if $b'=b$, output 1, else output 0

We say that the index-based SE scheme is secure in the sense of adaptive indistinguishability if for all polynomial-size adversaries A=($A_0, \ldots, A_{q+1}$), we have: $\Pr[IND^*_{SSE,A}=1] \leq \frac{1}{2}+negl(k \cdot p)$. We know that $\tau$ ($D_0, w_{0,1}, \ldots, w_{0,q}$)=$\tau$ ($D_1, w_{1,1}, \ldots, w_{1,q}$), hence trace does not leak any information if the scheme is secure.

Claim 3. We claim that if adversary A has a non-negligible advantage $\xi$ against StrongDPFsearch in $IND^*_{SSE,A}$ experiment, then A has same advantage against the DPF constructions described in references [4, 8].

Proof. The adversary follows the below mentioned steps to compute the nonzero point of the point function, and hence break the DPF constructions.

Step 1: $b \xleftarrow{\$} \{0, 1\}$
Step 2: ($D_0, D_1$)←$A_0$
Step 3: $I_b$←StrongDPFindex($D_b$)
Step 4: ($\omega_{0,1}, \omega_{1,1}$)← $\mathcal{A}_1(I_b)$
Step 5: $t_{b,1}$<-StrongDPFtrap($w_{b,1}$)
Step 6: for 2≤i≤q ($w_{0,i}, w_{1,i}$)←$A_i(I_b, t_{b,1}, \ldots, t_{b,i-1}$)
Step 7: let $t_b = (t_{b,1}, \ldots, t_{b,q})$
Step 8: $b'$←$A_{q+1}(I_b, t_b)$. Note that the adversary A computes $b'=b$, with probability $\xi + \frac{1}{2}$.

Step 9: Output $b'$. With probability $\xi + \frac{1}{2}$, $b'$ gives the nonzero points ($w_{b,i}$) of all point functions used to generate $I_b$ and $t_b$. Thus, the adversary breaks the DPF constructions without requiring any additional steps.

Embodiments of the present disclosure also provide for hiding keyword count and document size. For example, an output bit vector of StrongDPFsearch hides n i.e., the total number of documents in the database, but the number of point functions in a table is equal to the total number of keywords in the database. To hide the total number of keywords the owner can define some dummy point functions such that they evaluate to 0 for every input. One DPF share does not give any information about the output of the point function, hence the servers cannot identify the dummy point functions' DPF shares. To hide the document size from the servers the data owner can pad documents so that all documents in the database have the same size.

Embodiments of the present disclosure also provide for decreasing the server side time complexity. For example, in StrongDPFsearch, the data owner sends $\langle x_i^q, q \rangle$ as query to the servers. The servers evaluate their tables ($T_{Ser1}^q$ and $T_{Ser2}^q$) at $x_i^q$ and send the results to the owner. Evaluating the whole table at the queried point is important as this forces the dishonest server to produce an appropriate bit string of length k·n' to fool the data owner and as (k·n')≥200, the probability of dishonest server fooling the data owner is negligible.

If the data owner provides the servers i' ($Per(i \oplus r_q)$) before identifying the dishonest server then the dishonest server needs to guess only n' bits to avoid being caught. This can drastically increase chances of dishonest server of escaping the identification process. Thus, once the dishonest server has been identified, the owner includes i' in the future queries, reducing the server side and overall time complexity to $O(\lambda \cdot l)$.

Distinct keywords can be counted in each document. For example, the data owner can easily add the functionality of counting the number of distinct keywords present within each document. To add this functionality, the owner changes the output group of the point function family to $\mathbb{GF}(k'''')$, which has integer (positive) vectors of length n'' as its elements with addition modulo k as the group operator. The nonzero vector $\bar{v}_i$ defined for keyword $w_i$ is identical to the bit vector defined in the original StrongDPF search scheme i.e., a '0' value at $j^{th}$ entry implies that the document $d_j$ does not contain keyword $w_i$.

Let the data owner wishes to count the number of distinct keywords present within each document from the list: $w_1$, $w_2$, $w_7$. The data owner forms a query for these keywords by using any eligible $r_q$ value and sends the query to the servers. Upon receiving the query, servers evaluate their DPF shares at the points and add (integer addition) the resulting vectors locally. Each server returns the resulting value to the data owner, which performs a modular addition (mod k) of all the returned values to get the final result. The $i^{th}$ entry in the final integer vector has the count of the distinct keywords (out of $w_1$, $w_2$, $w_7$) present within document di. It is further noted that both XOR and addition operations are commutative.

With respect to logical OR and logical AND expressions, counting distinct keywords also gives the result of logical OR queries, for example the count answer for keyword list $w_1$, $w_2$, $w_7$ also gives answer to $w_i \lor w_2 \lor w_7$ because a>0 value at $i^{th}$ entry of the output vector implies a 'true' result for document $d_i$, whereas a value of '0' implies that none of the keywords ($w_1$, $w_2$, $w_7$) is present within document $d_i$.

Similarly if the count for some document is q mod k when queried for q distinct keywords then that document contains all the q keywords, else not. Thus, the count function also gives answer to both logical OR and logical AND expressions.

With respect to updating the index, to add a new keyword $w_j$, the data owner defines p new point functions $\{(f_j^1, \ldots, f_j^p) \in F\}$, using the p random integers ($r_1, \ldots, r_p$). The data owner creates two DPF shares ($DPF^1(f_j^i)$ and of the p point functions, and sends one share to each server. The servers add the new share at the end of the appropriate tables. Notice that the index of the DPF shares added at a later stage are not decided by the permutation function Per. Thus, it is preferable to decide on most of the keywords before the first index generation.

To remove a keyword $w_j$ from the index, the data owner computes: $j'=Per(j \oplus r_q)$, $(1 \leq q \leq p)$ and sends remove(j', q) to all servers. The servers on receiving a remove(j', q) message remove the j' entry of the $q^{th}$ table.

Updating the database by adding or deleting ñ documents is suboptimal as it requires the owner to define a new point function family: $F': \{0,1\}^l \rightarrow GF(2^{n''+\tilde{n}})$. The data owner create and/or define new point functions in F', and then create new keyword search index.

An example single-writer/multi-reader StrongDPFsearch Protocol is now described. In single-writer/multi-reader setting, the data owner maintains a set U of authorized users. To add a user $u_q$ to set U, the data owner sends it $<r_q,q>$ and $<i,w_i>$ values. Using this information $u_q$ can query for any keyword $w_i$ by calculating: $x_i^q = \omega_i \oplus r_q$, and sending query $<x_i^q,q>$ ($<x_i^q,q,i'>$ after the identification of the dishonest server) to the four servers. Note that in this setting the search pattern is exposed to the servers as to search for the same keyword an authorized user sends the same query. But the access pattern can still be hidden as the final result is computed by the users.

With respect to revocation, and to revoke a user $u_q$ from the set U, the data owner sends a revoke(q) message to all servers. On receiving a revoke(q) message, the servers delete tables $T_{Ser_1^q}$ and $T_{Ser_2^q}$. Now, even if user $u_q$ sends query $<x_i^q,q>$ with a valid $q' \xleftarrow{\$} \mathbb{Z}$, it will still receive incorrect result(s). The data owner then preferably picks a new $r_q$ value which is different from all the previously selected $r_i$ values (if no such value exists then the data owner preferably aborts). Using the new $r_q$ value, the data owner preferably creates tables $T_{Ser_1^q}$ and $T_{Ser_2^q}$, and sends them to all servers. Note that in multi-reader setting StrongDPFsearch can support a maximum of p users at a time.

The security and privacy follow from that of single-writer/single (i.e., same)-reader StrongDPFsearch. Procedures to count the number of distinct keywords in each document, and evaluate monotone Boolean functions are also similar to those used in the single-writer/single (i.e., same)-reader setting.

According to various alternative embodiments, there can be replacements for DPFs in the disclosed embodiments. For example, in the DPSSE scheme described above, DPFs can be replaced with multi-point functions or interval functions to realize additional and diverse search functionalities.

Figure 6:
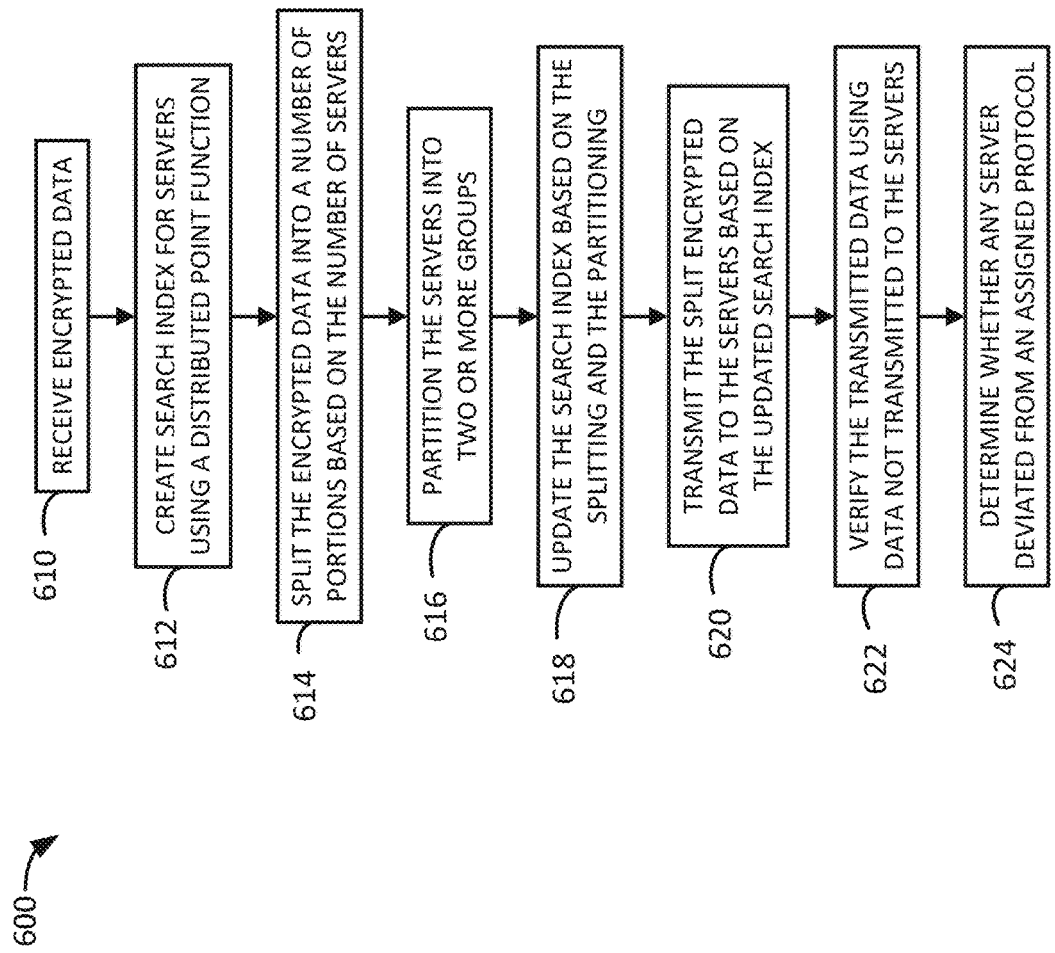
FIG. 6 is a flowchart for a method of performing a searchable encryption scheme, according to various embodiments.

FIG. 6 is a flowchart for a method 600 of performing a searchable encryption scheme, according to various embodiments.

As shown, method 600 includes operations to be performed in the computing environment 100 as shown in FIG. 1. Method 600 starts with operation 610, in which encrypted data is received. The encrypted data can be received at one or more data owner, one or more third party servers from a data owner directly or indirectly, etc. At operation 612, a search index is created for two or more servers using a distributed point function. At operation 614, the received encrypted data is split into a number of portions based on the number of servers. At operation 616, the servers are partitioned into two or more groups of servers. At operation 618, the search index is updated based on the splitting and the partitioning. At operation 620, the split encrypted data is transmitted to the servers based on the updated search index. At operation 622, the transmitted data is verified using data not transmitted to the servers (e.g., secret decryption key, etc.) At operation 624, a computer determines whether any server has deviated from an assigned protocol. As described herein, a server that deviates from an assigned protocol can be deemed to be a non-trustworthy or malicious server, and the malicious server can be excluded from future operations. Optionally, a signal can be transmitted as an indication that the identified server is non-trustworthy or dishonest, and as described herein, the method 600 can proceed after excluding the identified malicious server.

Figure 7:
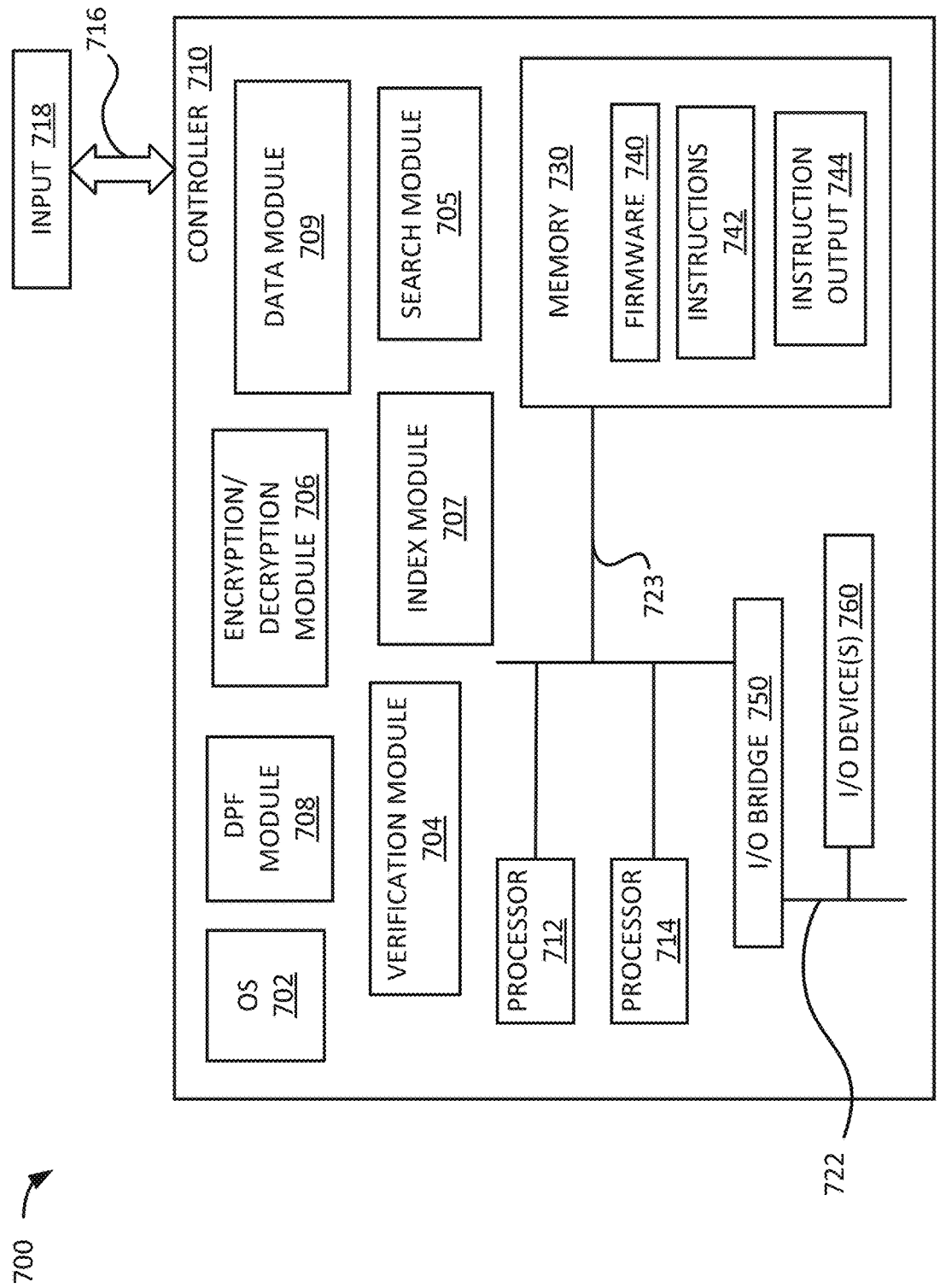
FIG. 7 is a block schematic diagram of a computer system according to embodiments of the present disclosure.

FIG. 7 is a block schematic diagram of a computer system 700 according to embodiments of the present disclosure. The computer system 700 can be implemented according to the computing environment 100 of FIG. 1.

Computer system 700, as shown, is configured with an interface 716 to enable controller 710 to receive a request to provide SE schemes that guarantee privacy, both in terms of access and search patterns, and correctness in the presence of malicious servers, as described in particular with regard to FIGS. 1-6. An input 718 may be received at interface 716. In embodiments, the interface 716 can enable controller 710 to receive, or otherwise access, the input 718 via, for example, a network (e.g., an intranet, or a public network such as the Internet), or a storage medium, such as a disk drive internal or connected to controller 710. The interface can be configured for human input or other input devices, such as described later in regard to components of controller 710. It would be apparent to one of skill in the art that the interface can be any of a variety of interface types or mechanisms suitable for a computer, or a program operating in a computer, to receive or otherwise access or receive a source input or file.

Processors 712, 714 included in controller 710 are connected by a memory interface 720 to memory device or module 730. In embodiments, the memory 730 can be a cache memory, a main memory, a flash memory, or a combination of these or other varieties of electronic devices capable of storing information and, optionally, making the information, or locations storing the information within the memory 730, accessible to a processor. Memory 730 can be formed of a single electronic (or, in some embodiments, other technologies such as optical) module or can be formed of a plurality of memory devices. Memory 730, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 700 can include a plurality of memory devices. A memory interface, such as 720, between one or more processors and one or more memory devices can be, for example, a memory bus common to one or more processors and one or more memory devices. In some embodiments, a memory interface, such as 723, between a processor (e.g., 712, 714) and a memory 730 can be point to point connection between the processor and the memory, and each processor in the computer 700 can have a point-to-point connection to each of one or more of the memory devices. In other embodiments, a processor (for example, 712) can be connected to a memory (e.g., memory 730) by means of a connection (not shown) to another processor (e.g., 714) connected to the memory (e.g., 723 from processor 714 to memory 730).

Computer 700 can include an input/output (I/O) bridge 750, which can be connected to a memory interface 720, or to processors 712, 714. An I/O bridge 750 can interface the processors 712, 714 and/or memory devices 730 of the computer 700 (or, other I/O devices) to I/O devices 760 connected to the bridge 750. For example, controller 710 includes I/O bridge 750 interfacing memory interface 723 to I/O devices, such as I/O device 760. In some embodiments, an I/O bridge can connect directly to a processor or a memory, or can be a component included in a processor or a memory. An I/O bridge 750 can be, for example, a peripheral component interconnect express (PCI-Express) or other I/O bus bridge, or can be an I/O adapter.

The I/O bridge 750 can connect to I/O devices 760 by means of an I/O interface, or I/O bus, such as I/O bus 722 of controller 710. For example, I/O bus 722 can be a PCI-Express or other I/O bus. I/O devices 760 can be any of a variety of peripheral I/O devices or I/O adapters connecting to peripheral I/O devices. For example, I/O device 760 can be a graphics card, keyboard or other input device, a hard disk drive (HDD), solid-state drive (SSD) or other storage device, a network interface card (NIC), etc. I/O devices 760 can include an I/O adapter, such as a PCI-Express adapter, that connects components (e.g., processors or memory devices) of the computer 700 to various I/O devices 760 (e.g., disk drives, Ethernet networks, video displays, keyboards, mice, styli, touchscreens, gesture input, etc.).

Computer 700 can include instructions executable by one or more of the processors 712, 714 (or, processing elements, such as threads of a processor). The instructions can be a component of one or more programs. The programs, or the instructions, can be stored in, and/or utilize, one or more memory devices of computer 700. As illustrated in the example of FIG. 7, controller 710 includes a plurality of programs or modules, such as verification module 704, search module 705, encryption/decryption module 706 (which can include authentication functionality), index module 707, distributed point function module 708, and data (e.g., document, plaintext, etc.) module 709. A program can be, for example, an application program, an operating system (OS) or a function of an OS, or a utility or built-in function of the computer 700. A program can be a hypervisor, and the hypervisor can, for example, manage sharing resources of the computer 700 (e.g., a processor or regions of a memory, or access to an I/O device) among a plurality of programs or OSes.

Programs can be "stand-alone" programs that execute on processors and use memory within the computer 700 directly, without requiring another program to control their execution or their use of resources of the computer 700. For example, controller 710 includes (optionally) stand-alone programs in verification module 704, search module 705, encryption/decryption module 706, index module 707, distributed point function module 708, and data module 709. A stand-alone program can perform particular functions within the computer 700, such as controlling, or interfacing (e.g., access by other programs) an I/O interface or I/O device. A stand-alone program can, for example, manage the operation, or access to, a memory (e.g., memory 730). A basic I/O subsystem (BIOS), or a computer boot program (e.g., a program that can load and initiate execution of other programs) can be a standalone program.

Controller 710 within computer 700 can include one or more OS 702, and an OS 702 can control the execution of other programs such as, for example, to start or stop a program, or to manage resources of the computer 700 used by a program. For example, controller 710 includes OS 702, which can include, or manage execution of, one or more programs, such as OS 702 including (or, managing) verification module 704, search module 705, encryption/decryption module 706, index module 707, distributed point function module 708, and/or data module 709. In some embodiments, an OS 702 can function as a hypervisor.

A program can be embodied as firmware (e.g., BIOS in a desktop computer, or a hypervisor) and the firmware can execute on one or more processors and, optionally, can use memory, included in the computer 700. Firmware can be stored in a memory (e.g., a flash memory) of the computer 700. For example, controller 710 includes firmware 740 stored in memory 730. In other embodiments, firmware can be embodied as instructions (e.g., comprising a computer program product) on a storage medium (e.g., a CD-ROM, DVD-ROM, flash memory, or disk drive), and the computer 700 can access the instructions from the storage medium.

In embodiments of the present disclosure, computer 700 can include instructions for data management and protection. Controller 710 includes, for example, verification module 704, search module 705, encryption/decryption module 706, index module 707, distributed point function module 708, and data module 709, which can operate to provide searchable symmetric encryption according to various embodiments herein.

The example computer system 700 and controller 710 are not intended to be limiting to embodiments. In embodiments, computer system 700 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, controller 710 can be, for example, a computing device having a processor (e.g., 712) capable of executing computing instructions and, optionally, a memory 730 in communication with the processor. For example, controller 710 can be a desktop or laptop computer; a tablet computer, mobile computing device, personal digital assistant (PDA), cellular phone, or other mobile device; or, a server computer, a high-performance computer (HPC), or a super computer. Controller 710 can be, for example, a computing device incorporated into a wearable apparatus (e.g., an article of clothing, a wristwatch, or eyeglasses), an appliance (e.g., a refrigerator, or a lighting control), a mechanical device, or, e.g., a motorized vehicle. It would be apparent to one skilled in the art that a computer embodying aspects and features of the disclosure can be any of a variety of computing devices having processors and, optionally, memory devices, and/or programs.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method for distributed and private symmetric searchable encryption, comprising:
    receiving encrypted data;
    creating a search index for one or more servers based on the encrypted data using a distributed point function (DPF);

splitting the encrypted data into a number of portions based on a number of the servers;
partitioning the servers into two or more groups;
updating the search index based on the splitting and the partitioning;
transmitting the split encrypted data to the servers based on the updated search index;
verifying the transmitted data using data not transmitted to the servers; and
determining, based on the verifying, whether any server of the servers deviated from an assigned protocol.

2. The method of claim 1, further comprising receiving an encrypted search query from a data owner, wherein the encrypted search query is configured for searching over the received encrypted data.

3. The method of claim 2, wherein the servers host the encrypted data and perform the search on the encrypted data without decrypting the data.

4. The method of claim 2, wherein the servers are not provided with capacity to decrypt the encrypted data or the encrypted search query.

5. The method of claim 2, wherein the encrypted search query is a keyword search.

6. The method of claim 2, wherein the determining and verifying steps are performed by the data owner.

7. The method of claim 1, wherein at least one server of the servers deviates from the assigned protocol, and wherein the method further comprises determining that the at least one server that deviates from the protocol is a malicious server.

8. The method of claim 7, wherein the at least one malicious server of the servers is discarded from the method of distributed and private symmetric searchable encryption.

9. The method of claim 1, wherein the DPF provides for randomized queries and hides search patterns.

10. The method of claim 1, wherein the number of the servers is at least two servers.

11. The method of claim 9, wherein the number of the servers is at least four servers.

12. The method of claim 1, wherein the data not transmitted to the servers comprises an encryption key.

13. The method of claim 1, further comprising reducing a share length of the DPF using a pseudorandom generator.

14. A system, comprising:
a hardware processor operatively coupled to a memory;
the hardware processor configured to execute instructions stored on the memory, including instructions for a process for improving data security or privacy in a computing environment, the process comprising:
receiving encrypted data;
creating a search index for one or more servers based on the encrypted data using a distributed point function (DPF);
splitting the encrypted data into a number of portions based on a number of the servers;
partitioning the servers into two or more groups;
updating the search index based on the splitting and the partitioning;
transmitting the split encrypted data to the servers based on the updated search index;
verifying the transmitted data using data not transmitted to the servers; and
determining, based on the verifying, whether any server of the servers deviated from an assigned protocol.

15. The system of claim 14, wherein an encrypted search query is received from a data owner, and wherein the encrypted search query is configured for searching over the received encrypted data.

16. The system of claim 15, wherein the servers host the encrypted data and perform the search on the encrypted data without decrypting the data.

17. The system of claim 14, wherein at least one server of the servers deviates from the assigned protocol, and wherein the method further comprises determining that the at least one server that deviates from the protocol is a malicious server.

18. The system of claim 17, wherein the at least one malicious server of the servers is discarded from the method of distributed and private symmetric searchable encryption.

19. A computer program product for improving data security or privacy, the computer program product comprising a non-transitory computer-readable storage medium having program code embodied therewith, the program code comprising computer-readable program code configured to cause a processor to perform the steps of:
receiving encrypted data;
creating a search index for one or more servers based on the encrypted data using a distributed point function (DPF);
splitting the encrypted data into a number of portions based on a number of the servers;
partitioning the servers into two or more groups;
updating the search index based on the splitting and the partitioning;
transmitting the split encrypted data to the servers based on the updated search index;
verifying the transmitted data using data not transmitted to the servers; and
determining, based on the verifying, whether any server of the servers deviated from an assigned protocol.

20. The computer program product of claim 19, wherein an encrypted search query is received from a data owner, and wherein the encrypted search query is configured for searching over the received encrypted data.

* * * * *